United States Patent [19]

Feamster, III

[11] 4,114,484
[45] Sep. 19, 1978

[54] PIPE CUTTING OR END PREPPING APPARATUS

[76] Inventor: William C. Feamster, III, 4013 Nina Dr., Chesapeake, Va. 23321

[21] Appl. No.: 742,354

[22] Filed: Nov. 16, 1976

[51] Int. Cl.$^2$ ............................................. B23B 5/16
[52] U.S. Cl. .................................... 82/4 C; 144/205; 408/104
[58] Field of Search ................. 408/81, 79, 80, 104, 408/111, 228; 82/4 C; 144/205

[56] References Cited

U.S. PATENT DOCUMENTS

| | | | |
|---|---|---|---|
| 794,939 | 7/1905 | Kohler | 82/4 C |
| 1,811,893 | 6/1931 | Parker | 82/4 C |
| 2,330,242 | 9/1943 | Romero | 408/104 |
| 3,700,343 | 10/1972 | Parry | 408/81 |
| 3,875,832 | 4/1975 | Mayfield | 144/205 |
| 3,992,123 | 11/1976 | Uyetake et al. | 408/104 |
| 3,999,452 | 12/1976 | Larsen | 82/4 C |

*Primary Examiner*—Leonidas Vlachos
*Attorney, Agent, or Firm*—Mason, Fenwick & Lawrence

[57] ABSTRACT

A pipe cutting or end prepping device capable of use in severely restricted spaces to cut through or shape for welding a hollow cylindrical pipe wall, which includes a rotatable tool bit support or carriage assembly adapted for insertion through an end of the pipe to be cut and located within the hollow bore of the pipe having one or more tool bits to cut into the pipe wall at the cutting site. A rotatable drive coupler is provided for releasably coupling a drive motor to the tool bit support or carriage for rotating the latter, and an anchor forming assembly in the form of a radially expandable and contractable annular collet forms a cylindrical pipe gripping surface to provide a stationary anchor station along the pipe adjacent the cutting site. A feed control assembly, for example, an elongated guide rod having a threaded end portion or a hollow tubular housing having a threaded end portion, together with a threaded drive nut coupled to the threaded end portion, supplies advancing force to the drive coupler and tool bit support or carriage for pulling the latter at a precisely controlled feed rate toward the anchor station to advance the tool bit or bits into the pipe wall at a predetermined rate.

15 Claims, 7 Drawing Figures

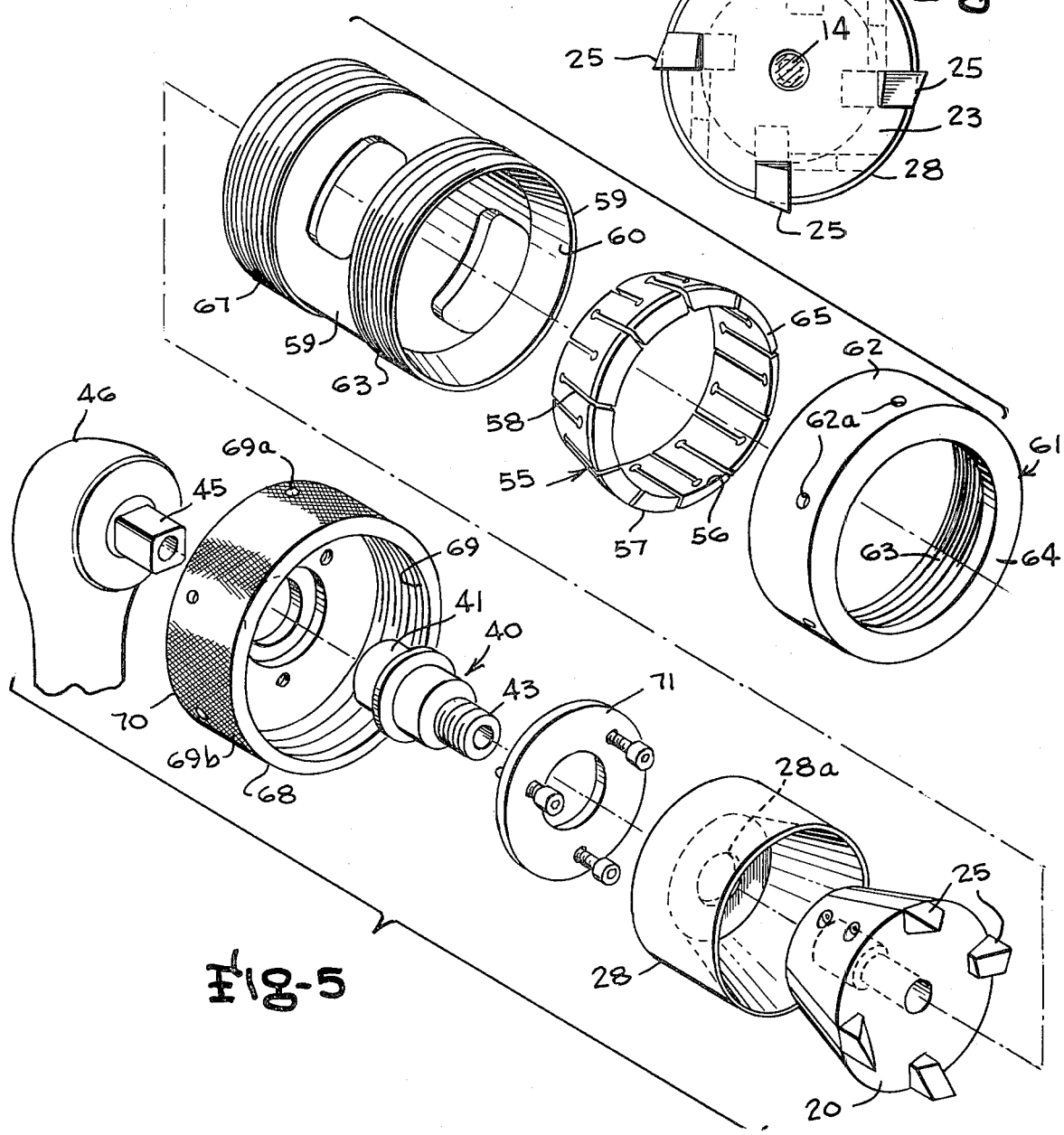

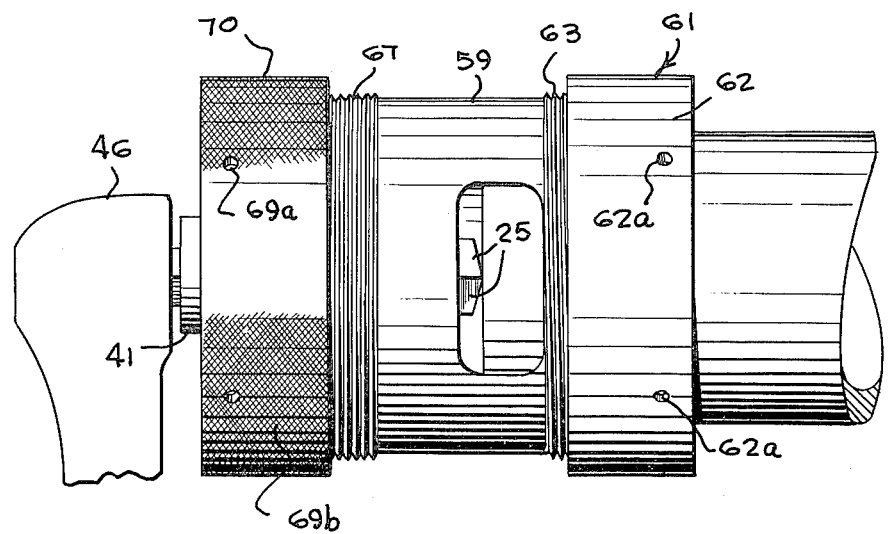
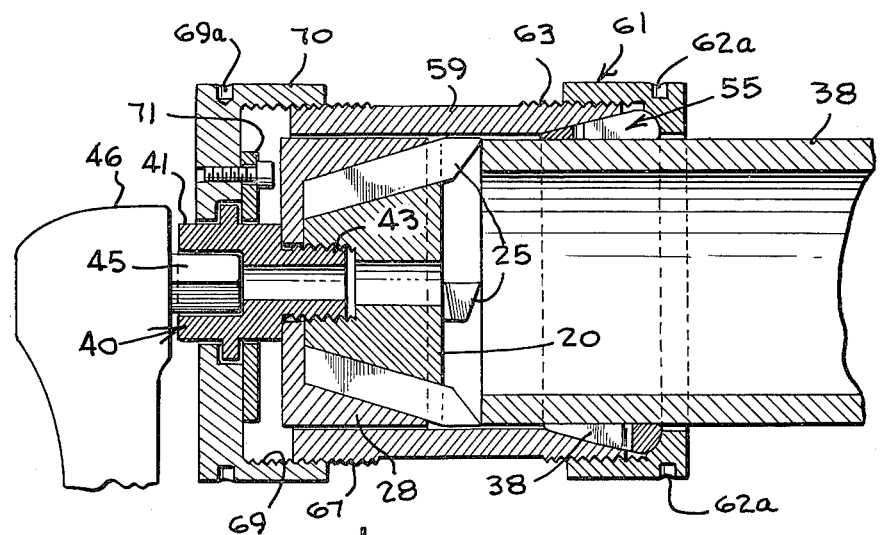

PIPE CUTTING OR END PREPPING APPARATUS

BACKGROUND AND OBJECTS OF THE INVENTION

The present invention relates in general to pipe prepping or cutting apparatus, and more particularly to apparatus having anchoring or gripping means to be releasably fixed at an anchoring station against the inside or outside surface of hollow pipe to be cut or to be prepped for welding, and having tool bit carriage means driven in a rotary path by a drive motor and advanced by feed means in a precisely regulated manner relative to the anchoring station to control the metal cutting action of the tool bit means.

There are many types of tube cutters or pipe cutters known in the art. Typically these pipe cutters or tube cutters include a cutting wheel and rollers mounted on a curved frame entirely surrounding or partially surrounding the pipe and include a handle for turning the cutter devices or a mechanism for forcing the cutter wheel into engagement with the pipe and regulating the cutting force as the wheel penetrates the wall of the pipe. Cutting tubing and pipes in cramped and confined locations, as where pipe sections must be removed and new sections welded on to repair heating or fluid conduit systems, are an extremely tedious and time consuming operation when performed by such typical pipe cutters. Often numerous shifts of the pipe cutter on the tubing are required to complete the operation. In the extremely confined or close quarters encountered in many pipe and conduit installations in naval vessels, particularly submarines, the problem of rapidly and effectively cutting off pipe, or the problem of preparing the edge of pipe which has already been cut to shape it to receive a weld for rewelding (frequently referred to as "prepping"), is particularly severe.

Most of the pipe cutters or prepping devices of the type which have elongated drive screw handles for advancing the cutter wheel or prepping wheel or tools into the pipe or about the pipe and which must be rotated through a 360° arc, are too large to be used effectively in such installations. Some effort has been made to alleviate these problems by providing a pipe cutting and/or preparing tool in the form of a plurality of segments which may be fitted together to form a collar encircling the pipe, and which has a rotating collar portion carrying the cutter tool which is driven by a gear mechanism around the pipe to form the cut and prepare the cut surface. However, this prior art device requires a cutter of such large size diametrically as to render it difficult to use in very confined spaces and because of the means provided for assembly and disassembly of the components, the assembly and disassembly procedure is slow and tedious, requiring approximately 25 to 30 minutes to complete the assembly of the cutting or prepping apparatus about the pipe. Also, because of the structure and the limited resistance to stripping of the members which hold the components together, the speed at which the rotary components are driven is severely limited.

Furthermore, there are many cases where the end portion of a pipe to be prepped for welding projects such a short distance from a bulkhead or wall that there is insufficient external pipe surface available on which to obtain a grip or purchase against the external pipe surface and provide an anchoring station toward which the cutting tool or the cutter or prepping device bit can be advanced along a precisely regulated feed path, and thus it is not possible in such confined spaces to achieve sufficiently precise regulation of the feed of the cutting tool or bit along the pipe axis.

Accordingly, an object of the present invention is the provision of a novel pipe cutting or prepping apparatus for cutting off pipe and/or preparing it for rewelding, which has means capable of fitting into or onto the wall of the pipe to be cut to grip the pipe wall and establish an anchoring station at locations spaced at predetermined distance from the surface to be cut or prepped, to which is coupled feed means for advancing a cutting tool and means for driving the cutting tool to achieve precisely regulated feeding of the cutting tool so as to cut or prep the pipe in a desired manner while the cutting tools are being driven.

Another object of the present invention is the provision of a novel pipe cutting or prepping assembly for cutting off pipe and/or prepping it for rewelding, wherein the pipe is located in highly confined or close quarters, which assembly has means for concurrently driving and precisely feeding along a tool advancing path a rotary cutting tool and means coupled thereto for gripping the pipe to be cut or prepped for establishing an anchoring station with respect to which the cutting tool is precisely advanced along its predetermined feed path. The apparatus includes a first type of anchor forming means for gripping the internal surface of the pipe wall of the pipe to be cut or prepped to establish the anchoring station in conditions where the exterior wall of the pipe is not sufficiently exposed, and includes a second type of anchor forming means for gripping the exterior surface of the pipe wall where the exterior surface is more conveniently accessible.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 3 is a longitudinal section view of the pipe prepping tool of the internal anchoring type;

FIG. 4 is a transverse section view of the pipe prepping tool of the internal anchoring type, viewed along the section line 4—4 of FIG. 3;

FIG. 5 is an exploded perspective view of a pipe prepping tool of the external anchoring type, embodying the present invention;

FIG. 6 is a side elevation view of the pipe prepping tool of the external anchoring type, shown assembled with adjacent portions of a pipe to be prepped; and FIG. 7 is a longitudinal section view of the pipe prepping tool of the external anchoring type.

DETAILED DESCRIPTION OF A PREFERRED EMBODIMENT

Figure 1:
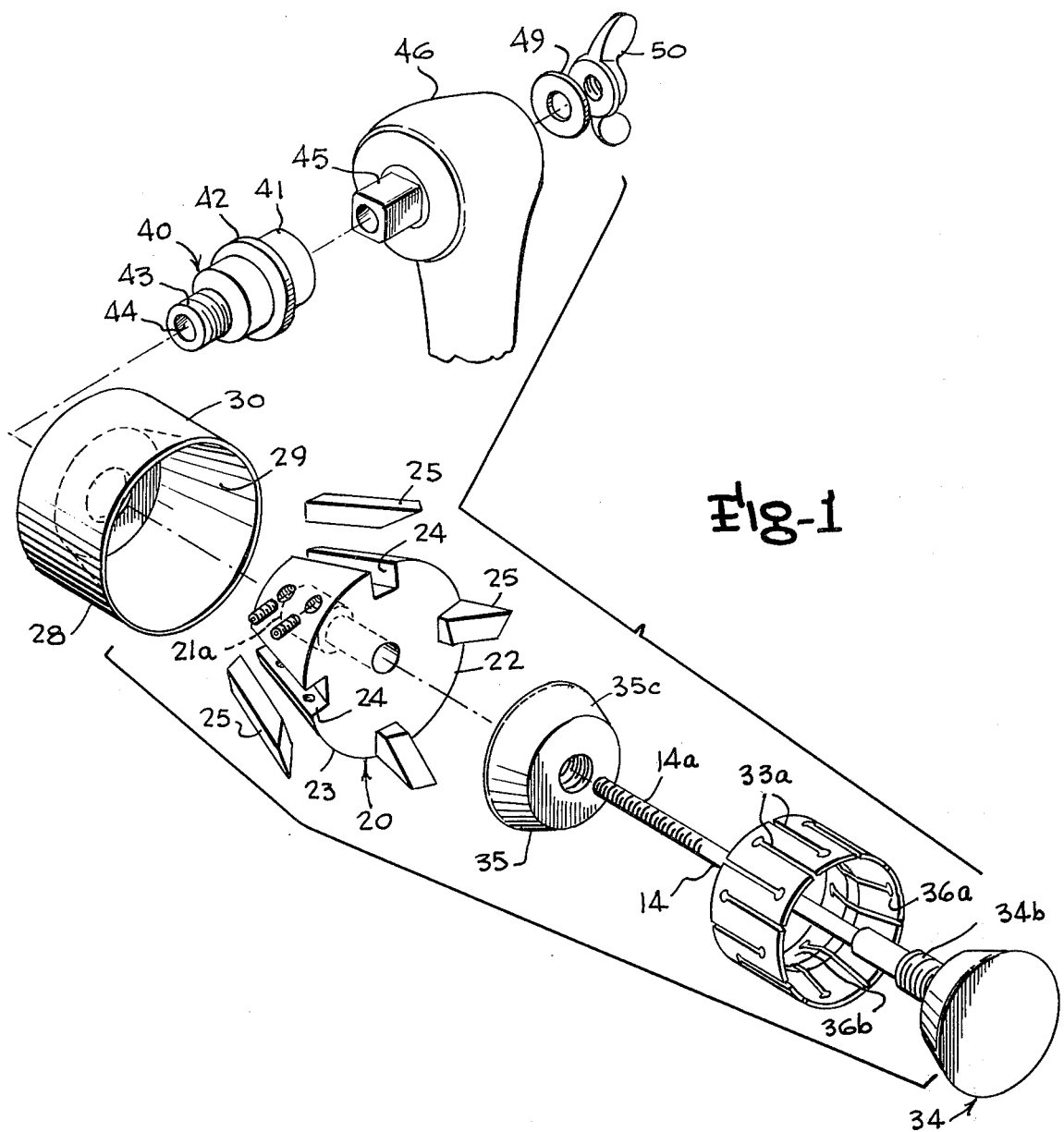
FIG. 1 is an exploded perspective view of a pipe prepping tool of the internal anchoring type, embodying the present invention.

Referring to the drawings, wherein like reference characters designate corresponding parts throughout the several figures, the present invention is illustrated in FIGS. 1–4 as a pipe prepping tool of the internal anchoring type provided with anchoring or gripping means of the internal anchoring type having feed and guide means associated therewith to achieve precisely regulated feeding of the pipe prepping tool bit or bits and driving of the same to provide proper prepping of the exposed end surface of a pipe section for welding. Referring particularly to FIGS. 1-4, the pipe prepping tool of the present invention includes a tool bit carriage assembly generally indicated at 12 rotatably journaled on a guide-feed rod or bar 14 having an internal anchoring assembly 16 on the forwardmost end thereof to be releasably frictionally anchored at a location within and against the internal surface of the pipe wall of a pipe to be prepped, near the end of the pipe to be prepped. Disposed rearwardly or relatively remote from the end of the pipe to be prepped are a drive and feed assembly, generally indicated at 18 which is made up of components guided for sliding and concurrent rotary movement on the guide-feed rod 14 and advanced in precisely regulated feeding movement along the guide-feed rod to force advancement of the tool bit in the carriage assembly in the direction of the end of the pipe to be prepped and precisely control the depth of cut being made in the exposed end of the pipe.

More specifically, the tool bit carriage assembly 12 of the internal mounting or anchoring pipe prepping tool 10 includes a tool carriage 20 of truncated conical configuration having a larger substantially circular front end wall 21 and a smaller diameter circular rear end wall 22, and a conical side wall 23 interrupted, in the illustrated embodiment, by four diametrically spaced tool bit receiving rectangular grooves 24 spanning the axial length of the tool carriage along axes paralleling the center axis thereof and shaped to receive tool bits 25 having working metal cutting ends 25a. The tool bits are removably fixed at the desired locations in their respective grooves or sockets 24 in the carriage by set screws indicated at 26. It will be appreciated that other forms of tool carriages may be used in place of the truncated conical tool carriage 20 and that various numbers of tool bits may be provided on the tool carriage, for example, either a single tool bit which may, if desired, be mounted to extend radially in a perpendicular relation to the guide and feed rod 14 or at a desired angle thereto, where it may be desired to form a cut entirely through the tube wall of a pipe progressing from the inner surface thereof radially outwardly through the pipe wall. Obviously, a plurality of tool bits pointing radially outwardly from the axis of the tool carriage and guide and feed rod or extending in an outwardly inclined relation with the working points lying in a single plane perpendicular to the axis of the guide and feed rod may be employed if desired in a cutting application.

The tool carriage 20 has a central bore 27 extending therethrough sized to rotatably support the carriage 20 concentrically on the guide and feed rod 14 for rotary movement about the axis thereof and for axial movement toward and away from the pipe end to be prepped. The rearmost portion of the central bore 27 is enlarged and threaded as indicated at 27a to provide a driving coupling between the tool carriage 20 and a drive shaft member to be later described. A tool bit retainer 28 also forms part of the tool bit carriage assembly 12 and comprises a cylindrical body of forwardly opening, generally cupped shaped configuration defining a forwardly opening well or recess 29 of truncated conical configuration substantially corresponding to that of the rearmost portion of the tool carriage 20 to receive that portion of the tool carriage in nested relation in the well embraced by the side wall or flange portion 30 of the retainer which securely retains the tool bits in their slots 24 in cooperation with the set screws. The end wall of the tool bit retainer 28 also has a central aperture 28a therein of approximately the diameter of the enlarged threaded bore portion 27a of the tool carriage.

The internal anchoring assembly 16 is made up of an annual collet 32 in the form of a ring which can be flexed or deformed radially outwardly by a pair of collet deforming members 34 and 35 assembled on the guide-feed rod 14. In the illustrated embodiment, the collet is formed of a ring of approximately triangular cross section as illustrated in FIG. 3 providing a cylindrical outer surface 33 which is the base of the cross-sectional triangle. The two remaining sides of the triangle defined by the ring cross section face inwardly and diverge radially outwardly of the center axis toward opposite ends of the collet 32 forming tapered cam surfaces 36a, 36b facing respectively toward the collet deforming members 34, 35 with the ring portion of the collet provided with a plurality of cuts, indicated at 33a, for example, extending through the major portion of the axial length of the collet and spaced circumferentially thereof, with alternate cuts opening through opposite ends of the collet, to render the collet flexibly deformable. The collet deforming members 34 and 35, as illustrated in the drawings, are of truncated conical configuration, adapted to fit into the cam recesses defined by the cam surfaces 36a, 36b and having tapered wedge portions 34a, 35a to engage and cam the inclined surfaces 36a, 36b of the collet radially outwardly into tight engagement with the inwardly facing surface of a pipe wall, such as the surface 38a of the pipe to be prepped, indicated at 38 in FIG. 2. In the illustrated embodiment, the forwardmost collet deforming member 34 is fixed on the end of the guide-feed rod 14, for example, by having the guide-feed rod 14 tightly driven into a socket in the collet deforming member 34, and has a threaded shank 34b which extends through the center opening of the annular collet 32 into a threaded center opening 35b of the deforming member 35 so that, upon rotation of the deforming member 35 threaded onto the shank 34b, the two collet deforming members 34 and 35 are drawn toward each other to force the collet to expand radially into tight engagement with the inwardly facing surface of the pipe wall 38a. If desired, the rearmost collet deforming member 35 may have a plurality of drive sockets 35c opening through the rear face thereof to facilitate rotation of the deforming member 35 on the threaded shank 34b of its companion member 34 by a spanner wrench or similar tool to facilitate expansion of the socket into tightly held engagement with the pipe wall.

Assembled onto the guide-feed rod 14 rearwardly or outwardly of the tool bit retainer 28 is a hollow drive shaft coupler 40 having a main body portion 41 from which a collar flange formation 42 projects along the midregion of the body portion 41, in the illustrated embodiment, with a threaded neck formation 43 extending forwardly from the body portion 41 toward the anchoring assembly, of an appropriate size to pass through the center aperture 28a of the tool bit retainer 28 and be coupled with the threads of the threaded enlarged bore portion 27a of the tool carriage 23. The drive shaft coupler 40 has a central bore or through passage 44 having a diameter over its major length to receive and slidably and rotatably fit the drive shaft coupler onto the guide-feed rod 14 and merging into an enlarged, nonround-cross section rearwardly opening socket portion 44a adapted to interfit on the non-round drive head 45 of the hollow drive spindle or drive shaft on an elongated arm portion 46 of a drive motor 47. In the illustrated example, the non-round drive head 45 of the drive motor and the socket portion 44a of the drive shaft coupler 40 are of square cross section, and the drive head 45 and arm portion 46 of the drive motor have a central through passage 48 to be disposed in coaxial alignment with the center openings of the drive shaft coupler 40, tool bit retainer 28, tool bit carriage 23, and the components of the anchoring assembly to receive the guide-feed rod 14 through the drive head 45 and drive motor arm 46. This portion of the guide-feed rod 14 is threaded, as illustrated in the drawings, and has an annular washer 49 fitted on the guide-feed rod abutting the rear end of the drive motor arm 46 at the exit of its through passage, and a feed nut 50, for example, in the configuration of a wing nut, is threaded onto the threaded portion 14a of the guide-feed rod rearwardly of the drive motor arm 46. The drive motor 46 may, for example, be a pneumatic motor of the right angle drive type having a square cross section drive spindle terminating in the drive head 45 which is approximately ½ inch along each of the sides of the square and having a through hole of about ¼ inch diameter, and in a satisfactory example, is designed to operate at a speed in excess of about 120 rpm from an air pressure supply in the order of about 90 psi.

Figure 2:
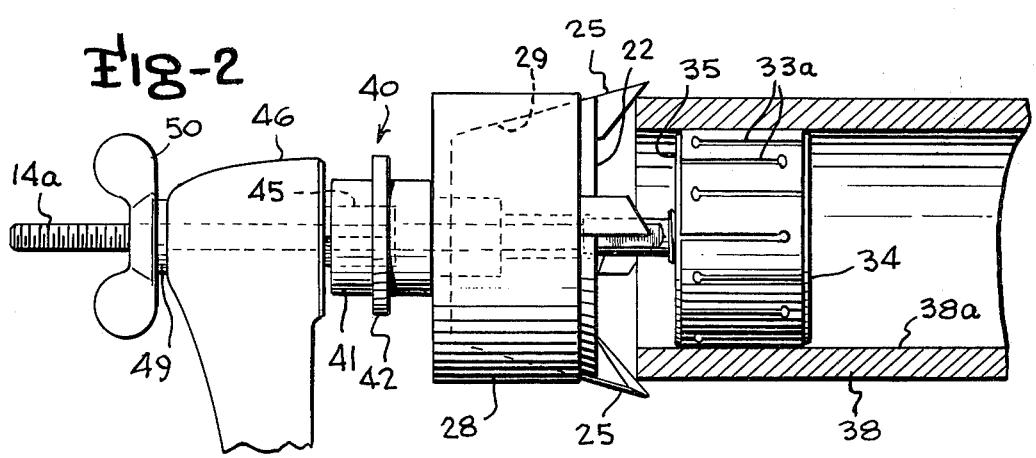
FIG. 2 is a side elevation view of the pipe prepping tool of the internal anchoring type shown assembled with adjacent portions of a pipe to be prepped.

It will be apparent that the pipe prepping tool assembly as described above can be readily used to form an angle bevel, as indicated at 51 in FIG. 2 on the exposed end of a pipe 38 to be prepared for welding, in confined quarters where suitable anchorage to an exterior surface portion of the pipe cannot be readily obtained, and achieve very precise cutting of the end of the pipe in such confined quarters to obtain the desired shape and dimension for the prepped end of the pipe. To properly mount or anchor the tool in the pipe to be prepped so that precise feed control of the tool bits can be achieved, the internal anchoring assembly portion 16 of the tool including the collet 32 and collet deforming members 34 and 35 assembled with the guide-feed rod 14 are inserted into the hollow interior of the pipe to assume a location adjacent the end to be prepped, for example, as illustrated in FIG. 2, and the rearmost or outer collet deforming member 35 is rotated by a spanner wrench or similar tool on the threaded shank portion 34b of its companion collet deforming member 34 to draw these two deforming members toward each other toward the center plane of the collet and force the outer wall of the collet tightly against the inner surface of the pipe wall. The tool bit carrier 23 assembled with the tool bit retainer 28 and drive shaft coupler 40, with the threaded portion 43 of the drive shaft coupler threaded into the threaded bore portion 27a of the tool carrier, are then assembled onto the rearwardly extending portion of the guide-feed rod 14 and slipped forwardly to bring the cutting edges of the tool bit to working position adjacent the edge of the pipe to be prepped. The drive spindle portion 45 of the motor 47 with the associated washer 49 are then assembled onto the guide-feed bar 14 and the drive head portion 45 is seated in the socket 44a therefor, and the feed nut 50 is then threaded onto the threaded portion 14 of the guide-feed bar and advanced to a position against the washer 49 ready to regulate progressive feeding of the tool bit carriage against the pipe end to be prepped and thus precisely regulate the progress of the cut being made by the tool bit cutting edges. With the air motor 47 operating to rotate the tool bit carriage 23 and the tool bit cutting edges in contact with the pipe end to be prepped, the feed nut 50 can then be manually advanced at the desired rate to progressively force the cutting edges of the bits along a feed path to produce the desired depth and shape of cut in the end of the pipe to be prepped, resulting in a beveled end such as that illustrated at 51 in FIG. 2.

In cases where the pipe to be cut is located in constricted or relatively inaccessible spaces and access cannot be readily obtained to the hollow interior of the pipe for an appropriate distance to effect proper anchorage with the internal anchoring assembly 16, external anchoring or mounting means as illustrated in FIGS. 5-7 may be employed to achieve a secure hold against the external surface of the pipe and achieve appropriate anchorage for precisely regulated feed of the cutting mechanism. In this assembly, the same truncated conical tool carriage 20 with its tool bits 25 seated in grooves 24 and held therein by set screws 25 and by the outer surrounding wall of the tool bit retainer 28 are used as were employed in the previously described embodiment, and are assembled with a hollow drive shaft coupler 40 of the same construction as that illustrated and described in connection with the internal anchoring form. However, instead of providing the internal anchoring assembly 16 with the rearwardly extending guide-feed rod 14, an external collet 55 is provided, in the form of a metallic ring having a generally cylindrical inner surface 56, a beveled or truncated conical outer surface 57, and having cuts 58 extending through the major portion of the axial length of the collet spaced circumferentially thereof, with alternate cuts opening through opposite ends of the collet to render it flexibly deformable. The inner cylindrical surface 56 of the external collet 55 is sized to have a diameter slightly greater than the outer diameter of the pipe to be prepped, and is fitted into the forward end portion of an axially elongated hollow housing sleeve or tube 59 with the beveled or inclined outer surface 57 of the collet bearing against an inclined or beveled cam portion 60 of the inner surface of the housing sleeve 59. The external collet 55 is retained in the forward end portion of the housing sleeve 59 by a collet deforming nut 61 which serves the same function as the collet deforming nut member 35 of the internal anchoring form, having an internally threaded rim portion 62 threaded onto the external threads 63 on the forward end of the housing sleeve 59 and having an annular stop shoulder or lip 64 bearing against the forwardmost end 65 of the collet to jam the collet within the housing sleeve 59 against the beveled cam portion 60 and force the collet to contract or deform into tightly gripping engagement with the exterior surface 66a of the pipe to be prepped, indicated at 66 in FIG. 6. Outwardly opening drive sockets 62a may be provided in the rim portion 62 of the collet deforming nut 61 to receive the nose or stud of a spanner wrench or a similar drive tool for application of appropriate torque to the collet deforming nut 61 to drive the external collet into tightly gripping relation with the pipe.

Threaded onto the threads 67 at the rearmost end of the housing sleeve 59 is an external feed nut member 68 having an internally threaded rim 69 coupled with the threads 67 and having an outer or base wall 70 which is centrally apertured to pass the body portion 41 of the drive shaft coupler 40 therethrough with the larger diameter collar flange 42 of the drive shaft coupler retained against the forwardly facing surface of the base wall 70 by a retainer ring 71 apertured to pass the portion of the body portion 41 of the drive coupler extending forwardly of the enlarged collar 42 while retaining the collar portion thereof against the base wall of the external feed nut 68. The retaining ring 71 can be fastened near its periphery to the base wall 70 of the external feed nut 68 in any desired manner, as by stud screws or other threaded fasteners, or by rivets or other fastening means if the drive shaft coupler 40 is to be permanently journaled to the external feed nut 68. The external feed nut 68, like the collet deforming nut 61, may have a plurality of outwardly opening, circumferentially spaced sockets 69a in the rim portion 69 to receive the stud or pen of a spanner wrench or similar tool to facilitate turning of the feed nut 68, and the external surface of its rim 69 is also preferably knurled as indicated at 69b to facilitate hand turning of the external feed nut.

In the use of this pipe prepping tool with the external anchoring or mounting assembly, the housing sleeve 59 with the external collet 55 loosely assembled therein by the collet deforming nut 61 is telescoped over the end portion of the pipe 66 to be prepped for welding so that the collet outwardly surrounds the exterior surface of the pipe to be prepped over a zone spaced from the end of the pipe a distance at least slightly greater than the portion of the pipe to be cut during the prepping operation. The collet deforming nut 61 is then rotated relative to the housing sleeve 59, for example, by a spanner wrench or similar tool having pin portions or projections to interfit in one or more of the sockets 62a, until the collet is deformed radially inwardly sufficiently, by engagement of the cam surfaces 60 of sleeve 59 with the beveled or truncated conical outer surface of the collet, until the collet tightly grips the exterior surface of the pipe 66. The tool carriage 20 with the tool bits 25 assembled thereon is threaded onto the threaded neck portion 43 of the drive shaft coupler 40 journaled on the external feed nut 68, with the threaded neck portion 43 extending through the center opening 28a of the tool bit retainer 28, and this subassembly of external feed nut 68, tool bit retainer 28 and tool carriage 20 is advanced toward the rearmost end of the housing sleeve 59 to insert the tool bit carriage 20 and tool bit retainer in the bore of the housing sleeve 59, and the external feed nut 68 is then threaded onto the threads 67 at the rear of the housing sleeve 59 to advance the cutting points of the tool bits to a position near or lightly engaging the end of the pipe 66 to be prepped. The square cross section head 45 of the drive spindle of the drive motor 47 is then fitted into the socket 44a in the drive shaft coupler 40 and the pneumatic motor 47 activated to rotate the tool carriage 20 at the desired speed, and the external feed nut 68 is then rotated, manually or by a spanner wrench or similar tool, to precisely advance the tool carriage 20 at the desired rate to produce the desired cut in the end of the pipe 66 so as to form a prepped end of the desired shape. The rotation of the external feeding nut 68 relative to the housing sleeve 59 will produce the desired advancement of the subassembly formed of the external feed nut 68, tool bit retainer 28, and tool carriage 20 due to the threaded intercoupling of the threaded rim 69 of the external feed nut 68 with the threads 67 of the housing sleeve 59.

I claim:

1. A pipe cutting or end prepping apparatus capable of use in severely restricted spaces to be mounted on a stationary hollow pipe in supported relation thereby gripping a cylindrical surface of the pipe and cut through or shape for welding a hollow cylindrical wall of the pipe at a cutting site along the pipe, comprising a rotatable tool bit support to be positioned immediately adjacent an end of the pipe to be cut and located in concentric relation with the center axis of the pipe to advance a cutting bit through adjacent portions of the pipe wall, the tool bit support having a front working end and a rear drive end spaced from the front end and having a tool bit carried by the tool bit support adjacent the working end in a predetermined cutting attitude directed outwardly relative to the pipe axis to position a cutting tip thereof to engage and cut into the pipe wall at the cutting site, a drive motor for the tool bit support to be located outwardly adjacent the pipe end and having a rotatable drive spindle to be aligned with the pipe center axis and project toward the tool bit support, a rotatable drive coupler releasably coupled to said tool bit support at the rear drive end thereof and to said drive spindle for rotation about and concentric with the pipe center axis, an anchor forming assembly for supporting the tool bit support from the pipe wall comprising a radially expandable and contractable annular collet defining a cylindrical pipe gripping surface to engage and be forced into tightly gripping relation with a cylindrical surface portion of the pipe wall adjacent the cutting site, a collet adjusting nut and a collet abutting member intercoupled with each other by a threaded coupling and having collet-forcing surfaces engageable with coactive surface portions of the collet to deform the collet into tight gripping engagement with the confronting pipe wall surface upon relative rotary movement of the adjusting nut relative to the collet abutting member, said anchor forming assembly providing a stationary anchor station adjacent the cutting site disposed at a location along the pipe axis spaced beyond the cutting site in a forward direction opposite the direction of the drive coupler from the cutting site, and a feed control assembly coupled to said anchor forming assembly having a manually adjustable threaded member and including means for supplying advancing force to said drive coupler and tool bit support for pulling the drive coupler and tool bit support at a precisely controlled feed rate toward the anchor station to advance the cutting tip into the pipe wall portion to be cut in predetermined relation to rotation of the threaded member of the feed control assembly for precisely controlling the depth and speed of cut made by the tool bit, said tool bit support and said drive spindle and drive coupler having center apertures aligned along the center axis of the tool bit support, and said collet abutting member having a rigid feed-guide rod fixed thereto and projecting therefrom through the collet and through said aligned center apertures for guiding the drive coupler and tool bit support therealong and having a threaded portion extending rearwardly beyond the drive spindle, and said manually adjustable threaded member being a feed nut threaded onto the threaded portion of said feedguide rod rearwardly of said drive spindle for applying a forward pushing force to the drive spindle upon relative rotation of the feed nut while the drive spindle is rotating to drive the tool bit support and thereby pull the drive spindle and drive coupler and tool bit support in abutment with each other toward the anchor station established by the anchor forming assembly to control cutting action of the tool bit against the pipe wall portion to be cut.

2. A pipe cutting or end prepping apparatus as defined in claim 1, wherein said anchor forming assembly is an internal anchoring mechanism to engage and tightly fix the mechanism against the inner surface of the hollow cylindrical pipe wall, said collet having an outwardly facing cylindrical surface normally having a diameter slightly smaller than the inner diameter of the pipe forming the pipe gripping surface thereof and deformable radially outwardly by said collet adjustment nut upon forced rotation of the latter relative to the collet abutting member to expand the outwardly facing cylindrical surface of the collet into tight gripping engagement with the inner surface of the pipe wall.

3. A pipe cutting or end prepping apparatus as defined in claim 2, wherein said collet has a pair of inwardly facing taper surfaces diverging from a smaller diameter adjacent the transverse mid-plane of the collet to maximum diameters at the opposite ends thereof forming cam surfaces of the collet, and said collet abutting member and collet adjusting nut comprising truncated conical members whose diameters progressively increase in opposite directions away from the mid-plane of the collet, the adjusting nut being forced upon rotation thereof by its threaded intercoupling with the abutting member toward the abutting member to cause the conical surface portions thereof to expand the outwardly facing collet surface into tight holding engagement with the pipe inner surface.

4. A pipe cutting or end prepping apparatus as defined in claim 3, wherein said collet abutting member includes a threaded shank portion projecting through the collet toward the tool bit support and said adjusting nut includes a threaded center opening threaded onto said threaded shank portion to force the truncated conical portions of the adjusting nut and abutting member toward and away from each other upon rotation of the adjusting nut relative to the abutting member.

5. A pipe cutting or end prepping apparatus as defined in claim 4, wherein said tool bit support is a tool carriage of truncated conical configuration with its larger diameter end forming said front working end, and means removably fixing a plurality of elongated tool bits in a conical path in outwardly and forwardly diverging relation to the center axis of the tool bit support at circumferentially spaced locations with the outermost ends of the tool bits terminating in shaped cutting tips defining an annular conical path conforming to a predetermined bevel end shape desired for prepping the pipe for welding.

6. A pipe end prepping apparatus as defined in claim 3, wherein said tool bit support is a carriage in the form of a truncated conical body having grooves in its periphery of a cross section corresponding to the cross section of the tool bits to receive the tool bits therein with their radially outermost surfaces flush with the conical outer periphery of the tool bit carriage and the cutting end portions of the tool bits projecting from the working portion of said carriage, and the apparatus including a tool bit retainer of generally cylindrical configuration having a truncated conical well conforming to the major portion of the truncated conical carriage and tool bits supported therein to receive the carriage and tool bits in nested relation within said well, and said drive coupler having a threaded neck portion projecting through the tool bit retainer and into a threaded socket in said tool bit carriage to assemble the same together.

7. A pipe cutting or end prepping apparatus as defined in claim 2, wherein said tool bit support is a tool carriage of truncated conical configuration with its larger diameter end forming said front working end, and means removably fixing a plurality of elongated tool bits in a conical path in outwardly and forwardly diverging relation to the center axis of the tool bit support at circumferentially spaced locations with the outermost ends of the tool bits terminating in shaped cutting tips defining an annular conical path conforming to a predetermined bevel end shape desired for prepping the pipe for welding.

8. A pipe cutting or end prepping apparatus as defined in claim 1, wherein said tool bit support is a tool carriage of truncated conical configuration with its larger diameter end forming said front working end, and means removably fixing a plurality of elongated tool bits in a conical path in outwardly and forwardly diverging relation to the center axis of the tool bit support at circumferentially spaced locations with the outermost ends of the tool bits terminating in shaped cutting tips defining an annular conical path conforming to a predetermined bevel end shape desired for prepping the pipe for welding.

9. A pipe and prepping apparatus capable of use in severely restricted spaces to be mounted on a hollow pipe in supported relation thereby gripping a cylindrical surface of the pipe, and form a predetermined bevel shape defining a truncated conical pipe and configuration to prepare the pipe for welding, comprising a rotatable tool bit carriage to be positioned immediately adjacent an end of the pipe to be prepped and located in concentric relation with the center axis of the pipe, the tool bit carriage having a front working end and a rear drive end spaced toward the pipe end from the front end and having a plurality of tool bit sockets for receiving elongated tool bits therein projecting along axes lying in a conical path diverging outwardly from the center axis of the carriage progressively from the rear to the front end thereof, the tool bits being located in a pair of mutually perpendicular diametric planes containing the axis of the tool carriage in a predetermined cutting attitude disposing cutting tips thereof in a truncated conical path corresponding to the bevel shape to be formed on the pipe end to engage and cut into the pipe end upon advancing movement of the carriage, a drive motor for the tool bit carriage to be located outwardly adjacent the pipe end and having a rotatable drive spindle to be aligned with the center axis of the pipe and project toward the tool bit carriage, a rotatable drive coupler releasably coupled to said tool bit carriage at the rear drive end thereof and to said drive spindle for rotation about the pipe center axis, an anchor forming assembly for supporting the tool bit carriage from the pipe comprising a radially expandable and contractable annular collet defining a cylindrical pipe gripping surface to engage and be forced into tightly gripping relation with a cylindrical surface portion of the pipe wall spaced inwardly along the pipe from the end to be cut, a collet adjusting nut and a collet abutting member intercoupled with each other by a threaded connection and having shaped surfaces engageable with coactive confronting surface portions of the collet to deform the collet into tight gripping engagement with the confronting pipe wall surface upon relative rotary movement of the adjusting nut relative to the abutting member, said anchor forming assembly providing a stationary anchor station forwardly adjacent and beyond the portion to be cut spaced along the pipe axis in a direction opposite the direction of the drive coupler from the pipe end, and a feed control assembly coupled to said anchor forming assembly having a manually adjustable threaded member and including means for supplying advancing force to said drive coupler and tool bit carriage for moving the drive coupler and tool bit carriage at a precisely controlled feed rate in relation to the anchor station and advance the cutting tips into the pipe wall to be cut in predetermined relation to rotation of the threaded member of the feed control assembly for precisely controlling the depth and speed of cut made by the tool bits, said tool bit carriage being a truncated conical body having grooves in the periphery of a cross section corresponding to the cross section of the tool bits to receive the tool bits therein with their radially outermost surfaces flush with the conical outer periphery of the tool bit carriage and the cutting end portions of the tool bits projecting forwardly from the front working end of said carriage, and a tool bit retainer of generally cylindrical configuration having a truncated conical well conforming to the major portion of the truncated conical carriage and tool bits supported therein to receive the carriage and tool bits in nested relation within said well, and said drive coupler having a threaded neck portion projecting through the tool bit retainer and into a threaded socket in said tool bit carriage to assemble the same together.

10. A pipe cutting or end prepping apparatus as defined in claim 9, wherein said anchor forming assembly is an internal anchoring mechanism to engage and tightly fix the mechanism against the inner surface of the hollow cylindrical pipe wall, said collet having an outwardly facing cylindrical surface normally having a diameter slightly smaller than the inner diameter of the pipe forming the pipe gripping surface thereof and deformable radially outwardly by said collet adjustment nut upon forced rotation of the latter relative to the collet abutting member to expand the outwardly facing cylindrical surface of the collet into tight gripping engagement with the inner surface of the pipe wall.

11. A pipe cutting or end prepping apparatus as defined in claim 10, wherein said collet has a pair of inwardly facing taper surfaces diverging from a smaller diameter adjacent the transverse mid-plane of the collet to maximum diameters at the opposite ends thereof forming cam surfaces of the collet, and said collet abutting member and collet adjusting nut comprising truncated conical members whose diameters progressively increase in opposite directions away from the mid-plane of the collet, the adjusting nut being forced upon rotation thereof by its threaded intercoupling with the abutting member toward the abutting member to cause the conical surface portions thereof to expand the outwardly facing collet surfaces into tight holding engagement with the pipe inner surface.

12. A pipe end prepping apparatus capable of use in severely restricted spaces to be mounted on a stationary hollow pipe in supported relation thereby gripping a cylindrical surface of the pipe and cut through or shape for welding a hollow cylindrical wall of the pipe at a cutting site along the pipe, comprising a rotatable tool bit support to be positioned immediately adjacent an end of the pipe to be cut and located in concentric relation with the center axis of the pipe to advance a cutting bit through adjacent portions of the pipe wall, the tool bit support having a front working end and a rear drive end spaced from the front end and having a tool bit carried by the tool bit support adjacent the working end in a predetermined cutting attitude directed outwardly relative to the pipe axis to position a cutting tip thereof to engage and cut into the pipe wall at the cutting site, a drive motor for the tool bit support to be located outwardly adjacent the pipe end and having a rotatable drive spindle to be aligned with the pipe center axis and project toward the tool bit support, a rotatable drive coupler releasably coupled to said tool bit support at the rear drive end thereof and to said drive spindle for rotation about and concentric with the pipe center axis, an anchor forming assembly for supporting the tool bit support from the pipe wall comprising a radially expandable and contractable annular collet defining a cylindrical pipe gripping surface to engage and be forced into tightly gripping relation with a cylindrical surface portion of the pipe wall adjacent the cutting site, a collet adjusting nut and a collet abutting member intercoupled with each other by a threaded coupling and having collet-forcing surfaces engageable with coactive surface portions of the collet to deform the collet into tight gripping engagement with the confronting pipe wall surface upon relative rotary movement of the adjusting nut relative to the collet abutting member, said anchor forming assembly providing a stationary anchor station adjacent the cutting site disposed at a location along the pipe axis spaced beyond the cutting site in a forward direction opposite the direction of the drive coupler from the cutting site, and a feed control assembly coupled to said anchor forming assembly having a manually adjustable threaded member and including means for supplying advancing force to said drive coupler and tool bit support for pulling the drive coupler and tool bit support at a precisely controlled feed rate toward the anchor station to advance the cutting tip into the pipe wall portion to be cut in predetermined relation to rotation of the threaded member of the feed control assembly for precisely controlling the depth and speed of cut made by the tool bit, said tool bit support being a carriage in the form of a truncated conical body having grooves in its periphery of a cross section corresponding to the cross section of the tool bits to receive the tool bits therein with their radially outermost surfaces flush with the conical outer periphery of the tool bit carriage and the cutting end portions of the tool bits projecting forwardly from the front working end of said carriage, and the apparatus including a tool bit retainer of generally cylindrical configuration having a truncated conical well conforming to the major portion of the truncated conical carriage and tool bits supported therein to receive the carriage and tool bits in nested relation within said well, and said drive coupler having a threaded neck portion projecting through the tool bit retainer and into a threaded socket in said tool bit carriage to assemble the same together.

13. A pipe and prepping apparatus as defined in claim 12, wherein said collet has a pair of inwardly facing taper surfaces diverging from a smaller diameter adjacent the transverse mid-plane of the collet to maximum diameters at the opposite ends thereof forming cam surfaces of the collet, and said collet abutting member and collet adjusting nut comprising truncated conical members whose diameters progressively increase in opposite directions away from the mid-plane of the collet, the adjusting nut being forced upon rotation thereof by its threaded intercoupling with the abutting member toward the abutting member to cause the conical surface portions thereof to expand the outwardly facing collet surface into tight holding engagement with the pipe inner surface.

14. A pipe end prepping apparatus capable of use in severely restricted spaces to be mounted on a stationary hollow pipe in supported relation thereby gripping a cylindrical surface of the pipe and cut through or shape for welding a hollow cylindrical wall of the pipe at a cutting site along the pipe, comprising a rotatable tool bit support to be positioned immediately adjacent an end of the pipe to be cut and located in concentric relation with the center axis of the pipe to advance a cutting bit through portions of the pipe wall, the tool bit support having a front working end and a rear drive end spaced from the front end and having a tool bit carried by the tool bit support adjacent the working end in a predetermined cutting attitude directed outwardly relative to the pipe axis to position a cutting tip thereof to engage and cut into the pipe wall at the cutting site, a drive motor for the tool bit support to be located outwardly adjacent the pipe end and having a rotatable drive spindle to be aligned with the pipe center axis and project toward the tool bit support, a rotatable drive coupler releasably coupled to said tool bit support at the rear drive end thereof and to said drive spindle for rotation about and concentric with the pipe center axis, an anchor forming assembly for supporting the tool bit support from the pipe wall comprising a radially expandable and contractable annular collet defining a cylindrical pipe gripping surface to engage and be forced into tightly gripping relation with a cylindrical surface portion of the pipe wall adjacent the cutting site, a collet adjusting nut and a collet abutting member intercoupled with each other by a threaded coupling and having collet-forcing surfaces engageable with coactive surface portions of the collet to deform the collet into tight gripping engagement with the confronting pipe wall surface upon relative rotary movement of the adjusting nut relative to the collet abutting member, said anchor forming assembly providing a stationary anchor station adjacent the cutting site disposed at a location along the pipe axis spaced beyond the cutting site in a forward direction opposite the direction of the drive coupler from the cutting site, and a feed control assembly coupled to said anchor forming assembly having a manually adjustable threaded member and including means for supplying advancing force to said drive coupler and tool bit support for pulling the drive coupler and tool bit support at a precisely controlled feed rate toward the anchor station to advance the cutting tip into the pipe wall portion to be cut in predetermined relation to rotation of the threaded member of the feed control assembly for precisely controlling the depth and speed of cut made by the tool bit, said anchor forming assembly being an external anchoring mechanism capable of deforming said collet to contract its cylindrical surface into outwardly encircling tight gripping contact with the exterior surface of said pipe wall to provide said stationary anchor station, the cylindrical gripping surface of said collet being a radially inwardly facing inner surface thereof and said collet having a tapered outer surface lying in a truncated conical path confronting the collet abutting member, said collet abutting member comprising an axially elongated annular cylindrical sleeve having an externally threaded front end portion and an inwardly facing tapered portion encircling and abutting the tapered surface portion of said collet, and said collet adjusting nut comprising an annular cylindrical nut member threaded onto the threaded front end portion of said sleeve having surface portions abutting the collet to force movement thereof axially of said sleeve for contracting the collet into tight gripping relation with the exterior surface of the pipe, said tool bit support being a carriage in the form of a truncated conical body having grooves in its periphery of a cross section corresponding to the cross section of the tool bits to receive the tool bits therein with their radially outermost surfaces flush with the conical outer periphery of the tool bit carriage and the cutting end portions of the tool bits projecting from the working portion of said carriage, and the apparatus including a tool bit retainer of generally cylindrical configuration having a truncated conical wall conforming to the major portion of the truncated conical carriage and tool bits supported therein to receive the carriage and tool bits in nested relation within said well, and said drive coupler having a threaded neck portion projecting through the tool bit retainer and into a threaded socket in said tool bit carriage to assemble the same together.

15. A pipe end prepping apparatus as defined in claim 14, wherein said collet adjusting nut includes a circular rear wall portion and means journaling said drive coupler for rotation in said rear wall portion, the drive coupler having a portion projecting rearwardly of said rear wall portion having a non-round, rearwardly opening socket therein to receive a portion of said drive spindle in said socket for driving the drive coupler and tool bit support from said drive spindle.

* * * * *